May 25, 1965  D. A. HASTINGS  3,185,042
FLUID PRESSURE MOTOR
Filed July 16, 1963
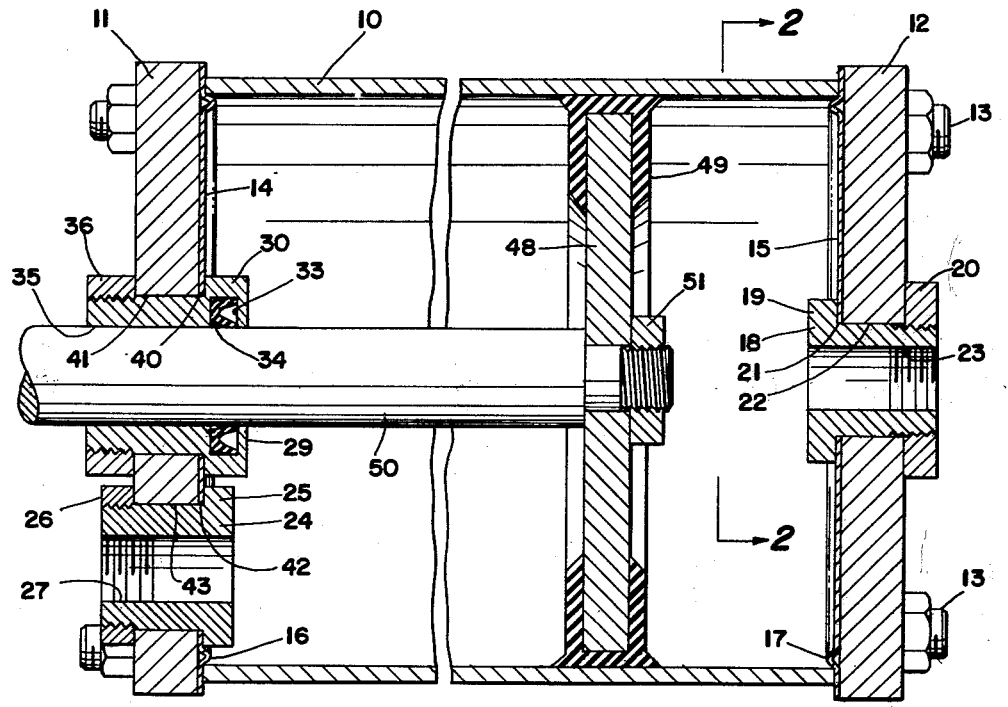
Fig. 1
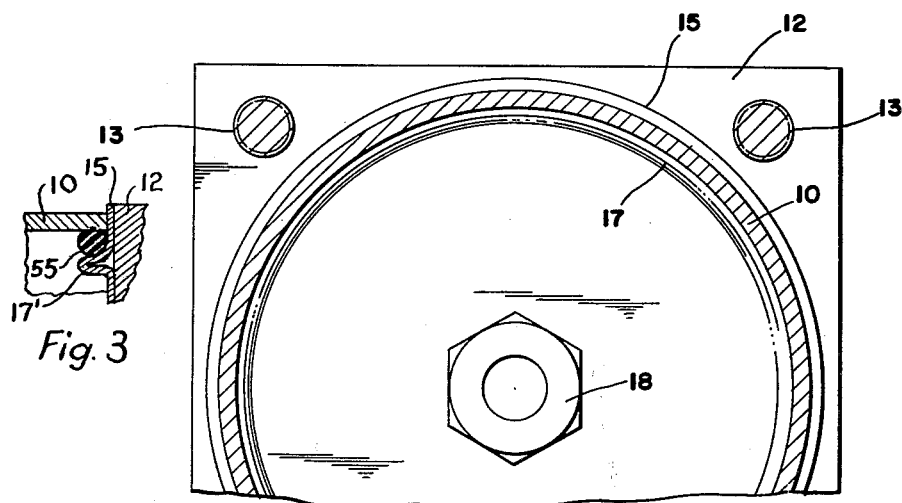
Fig. 3
Fig. 2
INVENTOR.
DOUGLAS A. HASTINGS
BY John N. Wolfram
ATTORNEY 3,185,042
FLUID PRESSURE MOTOR
Douglas A. Hastings, Glen Ellyn, Ill., assignor to Parker-Hannifin Corporation, Cleveland, Ohio, a corporation of Ohio
Filed July 16, 1963, Ser. No. 295,343
19 Claims. (Cl. 92—128)

This invention relates to fluid pressure motors and more particularly to motors for use with corrosive fluids, such as water.

When fluid pressure cylinders are provided for service with water or other corrosive fluids, the parts having contact with the fluid must be of materials which will not become corroded due to such contact. In water service, the metal parts in contact with the fluid must be of bronze, brass, stainless steel, or similar materials, or coated with materials such as chromium or nickel in order to perform satisfactorily for a reasonable length of time. Such materials are expensive and their use must be kept to a minimum in order to avoid excessive cost.

It is an object of the present invention to provide a fluid operated motor suitable for use with water or other corrosive fluids which is of low cost construction.

It is another object to provide a fluid motor of the type described in which the end caps are made of low cost material, such as carbon steel, but are protected from contact with the fluid by a thin liner of a non-corroding material.

It is another object to provide a fluid pressure cylinder having end caps of low cost material and a cylinder tube, the end caps being protected from contact with the fluid by liners of non-corrosive material which also serve to center the cylinder tube upon the end caps.

It is another object of the invention to provide a fluid pressure cylinder in which end caps are protected from contact with the fluid by liners and in which the liners are held in place by clamping members which also serve as either fluid port adapters or as a piston rod bearing.

Other objects of the invention will be apparent from the following description and from the drawings in which:

FIG. 1 is a longitudinal cross section view of the motor,

FIG. 2 is a section view along the lines 2—2 of FIG. 1, and

FIG. 3 is a fragmentary section view showing an optional method of sealing the liner relative to the cylinder tube.

In an embodiment of the invention for use with water as the motive fluid, the motor has a cylinder tube 10 which is made of bronze. The tube is closed at its ends by end caps 11, 12 which may be of low cost carbon steel. The end caps may be square in end view outline and held in position on tube 10 by tie rods 13.

On the inner face of the end caps are liners 14, 15 which are made of bronze sheet. Liners 14, 15 are formed with annular ribs 16, 17 which fit snugly within the bore cylinder tube 10 to locate the latter radially with respect to the end caps. The liners also extend between the end caps and the adjacent ends of cylinder tube 10 to serve as gaskets for sealing the joints therebetween.

Liner 15 is clamped in place upon end cap 12 by a clamping member which is in the form of a brass bushing 18 which extends through openings 21, 22 in plate 15 and end cap 12 with a close fit therewith for centering the plate on the end cap. Bushing 18 has a flange 19 in contact with plate 15 and is secured to the end cap by a nut 20. Bushing 18 is threaded at its outer end as at 23 for attachment to a conduit through which fluid may be introduced and expelled from the interior of the cylinder. Bushing 18 thus serves as a clamping member for attaching liner 15 to end cap 12 and as an adapter for connection to a conduit.

Liner 14 is secured to end cap 11 by a bushing 24 which is identical to bushing 18 and has a flange 25, a clamping nut 26 and a threaded opening 27 to which another conduit may be attached and through which fluid may be introduced and expelled from the opposite end of the cylinder.

Located centrally of end cap 11 is another brass bushing 29 which has a flange 30 for clamping liner 14 to end cap 11 and also has a packing chamber 33 in which an elastic packing ring 34 is mounted. Bushing 29 has a smooth bore opening 35 therethrough and is attached to end cap 11 by means of a threaded nut 36.

Liner plate 14 and end cap 11 have openings 40, 41 and 42, 43 for receiving bushings 30 and 24 with a close fit whereby the bushings center the liner plate upon the end cap.

Mounted for reciprocation within cylinder tube 10 is a piston 48 of brass or stainless steel. Piston 48 carries a sealing member 49 of elastic material which sealingly engages the inner wall of cylinder tube 10.

Attached to piston 48 is a rod 50 which may be of stainless steel. Rod 50 is connected to piston 48 by a threaded nut 51 which may be of a relatively corrosive material, such as carbon steel, and protected against corrosion by plating with a material such as chromium or nickel.

Rod 50 extends through bore 35 of bushing 29 and has a close fit therewith so as to receive bearing support therefrom. The rod is sealed by contact with packing ring 34.

In operation, water under high pressure is admitted to one end of cylinder tube 10 through bushing 18 to move piston 48 toward the opposite end of the cylinder tube for extending rod 50. At the same time, water under low pressure is expelled from such opposite end of the cylinder tube through bushing 24. Travel of the piston and rod is reversed by admitting water under pressure through bushing 24 and permitting water to be expelled from the cylinder through bushing 18.

From the foregoing it is evident that a fluid pressure motor has been provided which is of simple and cheap construction and yet which is fully protected against corrosion by contact with the motive fluid. Moreover, the liner which protects the end caps serves the additional purpose of centering the cylinder tube. In addition, the bushings which locate and clamp the liner to the end caps also serve additional purposes as either fluid inlet ports or as a bearing and packing retainer for supporting and sealing the piston rod.

In an optional form of the invention shown in FIGURE 3, rib 17' in liner 15 is made to a smaller diameter than the corresponding rib 17 of FIGURE 1 and an O ring 55 is bonded thereto. The initial outside diameter of the O ring when bonded in place on rib 17 is slightly larger than the inside diameter of tube 10, as indicated by the dotted line.

Upon forcing of the tube end over the O ring, the latter is distorted in its cross section so as to constantly apply sealing pressure to the tube. This sealing pressure is increased when fluid pressure within the cylinder acts upon the O ring. Also, in this arrangement the cylinder tube is centered relative to liner 15 by its contact with the O ring.

Although two forms of the invention have been illustrated and described, it is obvious that other modifications may be made therein without departing from the scope of the invention as defined by the claims.

I claim:

1. A fluid pressure device comprising a cylinder tube with closure means at each end thereof, a piston movable within the cylinder, a liner plate on the inner side of at least one of said closure means, said liner plate having means for centering the tube thereon.

2. The fluid pressure device of claim 1 in which said centering means comprises an annular projection on said liner snugly receivable within the cylinder tube.

3. The fluid pressure device of claim 1 in which said liner is interposed between one end of the tube and one of the end caps and serves as a gasket for sealing the joint therebetween.

4. The device of claim 1 in which there is an axial opening in said one closure means and in said liner plate, and there is a clamping member extending through said openings and clamping said liner to said one closure means.

5. The device of claim 4 in which said clamping member has a flange on its inner end engageable with the liner for clamping the liner against said one closure means.

6. The device of claim 4 in which said clamping member has an opening therethrough through which fluid may be introduced into the cylinder tube.

7. A fluid pressure motor comprising a cylinder tube with closure means at each end thereof, a piston movable within the cylinder and having a piston rod extending therefrom, a liner plate on the inner side of at least one of said closure means for preventing contact of fluid within the cylinder tube with said one closure means, attachment means extending through said liner plate and said one of said closure means and clamping said plate to said one closure means, said attachment means having a bore therethrough, said piston rod extending through said bore, and a sealing member in contact with said rod and said attachment means for sealing said bore against leakage of fluid from said cylinder tube.

8. The motor of claim 7 in which said attachment means has a shoulder within said cylinder engageable with said plate for clamping the latter against said one closure means.

9. The fluid pressure device of claim 1 in which said centering means includes a packing in sealing engagement with the tube.

10. The fluid pressure device of claim 1 in which said centering means includes a resilient packing which is responsive to fluid pressure within the cylinder for maintaining the packing in sealing engagement with the tube.

11. The fluid pressure device of claim 1 in which said means includes an annular rib on said liner and a resilient packing between the rib and the tube.

12. The fluid pressure device of claim 1 in which said means includes a resilient packing ring secured to the liner.

13. The fluid pressure device of claim 1 in which said means includes an O ring bonded to the liner and initially of slightly greater diameter than the inside diameter of the tube whereby the O ring is distorted into sealing engagement with the tube in its final assembled position.

14. A fluid pressure motor comprising a cylinder tube closed at its ends by first and second end caps, a piston movable within the tube and carrying a piston rod, a liner plate on the inner side of each end cap for preventing contact of fluid within the tube with the end caps, openings through the end caps and plates, a first clamping member extending through the openings in the first end cap and its plate and clamping the two together, a second clamping member extending through the openings in the second end cap and its plate and clamping the two together, the first clamping member having a port for introducing fluid into the tube, the second clamping member having a bore through which the piston rod extends.

15. The motor of claim 14 in which the second clamping member carries a packing for sealing the piston rod.

16. The motor of claim 14 in which the second end cap and its liner plate each have another opening therethrough through which a third clamping member extends, said third clamping member having a port through which fluid may be introduced into the cylinder tube.

17. The motor of claim 16 in which the first and third clamping members have means for attachment to conduits for fluid.

18. The motor of claim 14 in which each liner plate is centered on its end cap by the associated clamping members and each liner plate has a means for centering the cylinder tube on the end caps.

19. The motor of claim 14 in which each liner plate extends between its associated end cap and the adjacent end of the cylinder tube and serves as a gasket for sealing the joint therebetween.

References Cited by the Examiner
UNITED STATES PATENTS 2,246,535  6/41  Playfair _____ 92—164
2,682,256  6/54  Bowman _____ 92—164

RICHARD B. WILKINSON, *Primary Examiner.*